(12) United States Patent
Izawa

(10) Patent No.: US 6,211,885 B1
(45) Date of Patent: *Apr. 3, 2001

(54) APPARATUS FOR OUTPUTTING AN IMAGE IN WHICH DATA OF POINTS ON TEXTURE PATTERN ARE MAPPED TO DATA OF DOTS ON DISPLAY PLANE

(75) Inventor: Yasuhiro Izawa, Sanda (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/499,437

(22) Filed: Jul. 7, 1995

(30) Foreign Application Priority Data

Jul. 8, 1994 (JP) .................................... 6-157675

(51) Int. Cl.[7] ........................................ G06T 11/40
(52) U.S. Cl. ................................. 345/430; 345/431
(58) Field of Search .................... 395/130, 131, 395/132, 800.32; 345/430, 431, 432, 150, 153, 506, 508, 199

(56) References Cited

U.S. PATENT DOCUMENTS

| | | |
|---|---|---|
| 4,839,828 * | 6/1989 | Elsner et al. .................. 395/135 |
| 4,841,291 * | 6/1989 | Swix et al. .................. 345/145 X |
| 4,874,164 * | 10/1989 | Miner et al. .................. 345/189 |
| 4,924,415 * | 5/1990 | Winser ........................ 345/508 X |
| 5,051,928 * | 9/1991 | Gruters ........................ 395/131 |
| 5,249,263 * | 9/1993 | Yanker ........................ 395/131 |
| 5,341,468 * | 8/1994 | Shiraishi et al. .............. 395/132 |
| 5,778,250 * | 7/1998 | Dye ............................ 395/800.32 |

FOREIGN PATENT DOCUMENTS 6380375  4/1988  (JP) ........................... G06F/15/72

OTHER PUBLICATIONS

IBM Technical Disclosure Bulletin, vol. 30, No. 8, Jan. 1988.*

* cited by examiner

Primary Examiner—Mark Zimmerman
Assistant Examiner—Lance W. Sealey
(74) Attorney, Agent, or Firm—Cooper & Dunham LLP

(57) ABSTRACT

An image outputting apparatus in which a texture mapping is carried out includes: a map memory for storing a texture map in which a plurality of predetermined colors of all points on a texture pattern are defined at addresses of the map memory; a storing unit for storing at least a control color value and a control luminance value; a detecting unit for detecting whether or not one of the predetermined colors read from the map memory is in accordance with a specified color indicated by the control color value; and a selecting unit for selectively outputting either an original luminance of a dot on a display plane or a changed luminance indicated by the control luminance value, in accordance with a result of the detection.

4 Claims, 6 Drawing Sheets

| LUT ADDRESS | | | | |
|---|---|---|---|---|
| 0 | $R_0$ | $G_0$ | $B_0$ | ⎫ |
| ⋮ | ⋮ | ⋮ | ⋮ | ⎬ FIRST AREA |
| S | $R_S$ | $G_S$ | $B_S$ | ⎭ |
| S+1 | $R_{S+1}$ | $G_{S+1}$ | $B_{S+1}$ | ⎫ |
| ⋮ | ⋮ | ⋮ | ⋮ | ⎬ SECOND AREA |
| N | $R_N$ | $G_N$ | $B_N$ | ⎭ |

APPARATUS FOR OUTPUTTING AN IMAGE IN WHICH DATA OF POINTS ON TEXTURE PATTERN ARE MAPPED TO DATA OF DOTS ON DISPLAY PLANE

BACKGROUND OF THE INVENTION

The present invention relates to an image outputting apparatus for outputting a computer graphic image in which picture data of points on a texture pattern are mapped to picture data of dots on a display plane.

An image outputting apparatus outputs onto a display plane a three-dimensional (3D) computer graphic image in which luminances and colors of points in a portion of a texture pattern are projected onto luminances and colors of dots in a portion of the display plane. The appearance of the dots with the transformed picture data on the display plane is distinguishable from the appearance of other dots with non-transformed picture data thereon. This image outputting apparatus is very useful for engineers to check the result of an engineering design or to evaluate the appearance of an output image on a development phase.

Hereinafter, the mapping of the picture data of points on the texture pattern to the picture data of dots on the display plane is called the texture mapping.

In a conventional image outputting apparatus of the above type, a two-dimensional texture pattern is divided into line segments in parallel to scanning lines. Picture elements of dots on the display plane are generated by scanning the line segments in the scanning line direction. To realize this, it is necessary to carry out inverse perspective transformation for each of the picture elements of the dots.

The above conventional apparatus must perform matrix operations for each of picture elements of dots on the display plane. Thus, the processing speed is considerably low. Also, in some case of the mapping of picture data of a unit polygon from the texture pattern to picture data of a unit polygon on the display plane, the above conventional apparatus is difficult to obtain an accurate result of the texture mapping. In such a case, an output graphic image with a low quality may be produced by the above conventional apparatus.

Japanese Laid-Open Patent Application No.63-80375 discloses an image outputting apparatus in which the above problems are eliminated. The purpose of this conventional apparatus is to carry out a special-effect imaging function with a better picture quality and a higher processing speed. This special-effect imaging is carried out by making use of the texture mapping described above.

The conventional apparatus, disclosed in the above-mentioned publication, outputs an image in which picture data of points on the two-dimensional texture pattern are projected onto picture data of dots of a polygon (or a surface of an object) on the display plane. This conventional apparatus includes an I/O (input-output) interface unit, a memory, a line segment digital differential analyzer, a scan line digital differential analyzer, and others.

However, generally, picture data of all points in a texture pattern are arranged in a matrix formation, similarly to picture data of a graphic image stored in a frame memory. For example, in order to prepare a texture pattern whose picture data are arranged in a formation of a matrix of 256×256dots, a total of $2^{16}$ colors for picture data of the texture pattern is required. Supposing that a binary representation of one color consists of 3×8bits (R, G, B) of information, a storage capacity of a memory for storing the picture data of the texture pattern in this example must be about 1.5 megabits (=3×8bits×$2^{16}$).

Therefore, in order to realize the special-effect imaging on an image outputting apparatus, it is necessary to incorporate a large number of memories for storing various texture patterns into the apparatus. Such texture patterns are used for outputting images of different frames on the display plane when the special-effect imaging is carried out. The apparatus into which various memories are incorporated is excessively large in size, and the cost of the manufacture is increased considerably. Accordingly, the approach of the above conventional apparatus is unsuitable for practical use.

SUMMARY OF THE INVENTION

Accordingly, it is a general object of the present invention to provide an improved image outputting apparatus in which the above-described problem is eliminated.

Another object of the present invention is to provide an image outputting apparatus which carries out a special-effect imaging by using a single map memory in which a texture map is stored.

Still another object of the present invention is to provide an image outputting apparatus which carries out a special-effect imaging by using a simple structure and a map memory having a reasonably small size.

The above-mentioned objects of the present invention are achieved by an image outputting apparatus which includes: a map memory for storing a texture map in which a plurality of predetermined colors of all points on a texture pattern are defined, each of the predetermined colors being read from the map memory when an address of the map memory indicating a point on the texture pattern is input; a storing unit for storing at least a control color value and a control luminance value; a detecting unit for detecting whether or not one of the predetermined colors read from the map memory is in accordance with a specified color indicated by the control color value output from the storing unit; and a selecting unit for selectively outputting either an original luminance or a changed luminance indicated by the control luminance value output from the storing unit, in accordance with a result of the detection by the detecting unit.

The above-mentioned objects of the present invention are achieved by an image outputting apparatus which includes: a lookup table memory for storing a lookup table in which a plurality of predetermined colors of points in a first area on a texture pattern and a plurality of predetermined colors of points in a second area on the texture pattern are defined, each of the predetermined colors being read from the lookup table memory when an address of the lookup table memory indicating a point on the texture pattern is input; a map memory for storing a map in which a plurality of lookup-table memory addresses indicating all the points on the texture pattern are defined, each of the lookup-table memory addresses being read from the map memory when an address of the map memory indicating a point on the texture pattern is input; a storing unit for storing at least a control address value and a control luminance value; a detecting unit for detecting whether or not one of the lookup-table memory addresses read from the map memory is in accordance with a specified memory address indicated by the control address value output from the storing unit; and a selecting unit for selectively outputting either an original luminance or a changed luminance indicated by the control luminance value output from the storing unit, in accordance with a result of the detection by the detecting unit.

According to the present invention, it is possible that the original luminance of a texture-pattern dot for one frame be changed to a first luminance, and the original luminance of the same dot for another frame be changed to a second luminance. The first and second luminances can freely be specified by defining control values output from a central processing unit for each of the frames.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENTS

Figure 1:
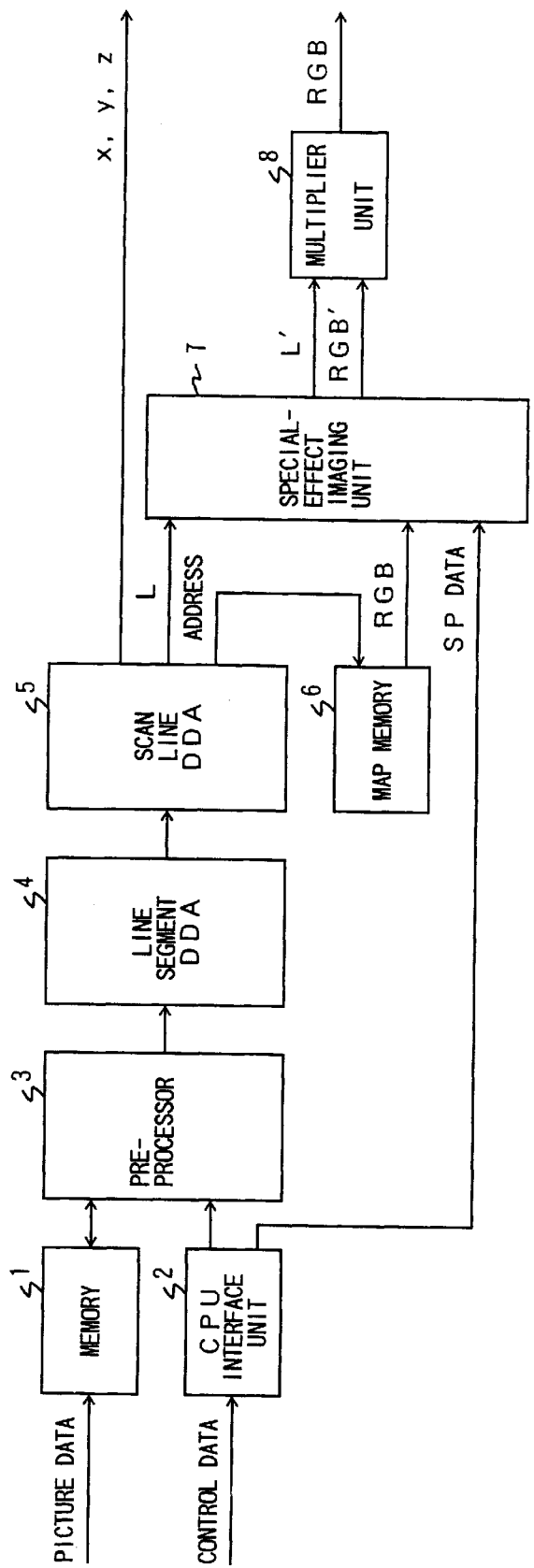
FIG. 1 is a block diagram of an image outputting apparatus in a first embodiment of the present invention.

A description will now be given of an image outputting apparatus in a first embodiment of the present invention, with reference to FIG. 1. FIG. 1 shows an image outputting apparatus in the first embodiment.

In FIG. 1, picture data from a central processing unit (CPU) is stored in a memory 1. The picture data includes: three-dimensional coordinates of vertexes of a polygon (or an object); luminances of the vertexes; two-dimensional coordinates (u, v) of points on a texture pattern; and commands related to the polygon.

Also, control data from the CPU is supplied to a CPU interface unit 2. This control data includes a special-effect command and a SP data.

The picture data stored in the memory 1 and the CPU control data from the CPU interface unit 2 are supplied to a preprocessor 3. The preprocessor 3 outputs processed picture data to a line segment digital differential analyzer (DDA) 4. To output the processed picture data, the preprocessor 3 carries out a selection of line segments based on the picture data read from the memory 1, and carries out a division of the polygon based on the picture data read from the memory 1.

The line segment DDA 4 transforms the processed picture data of the vertexes of the polygon from the preprocessor 3 into picture data of line segments on scanning lines. To output the picture data of the line segments, the line segment DDA 4 carries out an interpolation of the processed picture data of the vertexes of the polygon through digital differential analysis. The picture data of the line segments is supplied from the line segment DDA 4 to a scan line digital differential analyzer (DDA) 5.

The scan line DDA 5 transforms the picture data of the line segments from the line segment DDA 4 into picture data of dots on the display plane. To output the picture data of the dots, the scan line DDA 5 carries out an interpolation of the picture data of the line segments through digital differential analysis. The picture data of the dots, output from the scan line DDA 5, include three-dimensional coordinates (x, y, z) of the dots, luminances (L) of the dots, and specific addresses of a map memory 6.

The three-dimensional coordinates (x, y, z) of the dots are supplied from the scan line DDA 5 to a frame memory (not shown). The luminances (L) of the dots are supplied from the scan line DDA 5 to a special-effect imaging unit 7. The addresses of the map memory 6 are calculated at the scan line DDA 5 based on the two-dimensional coordinates (u, v) of the points on the texture pattern, and supplied from the scan line DDA 5 to the map memory 6.

Each of the line segment DDA 4 and the scan line DDA 5 comprises a subtracter and an adder. Each result of subtraction from the subtracter is accumulated on the adder. The line segment DDA 4 and the scan line DDA 5 are capable of carrying out interpolation processes in parallel.

The map memory 6 stores a texture map in which a plurality of predetermined colors (RGB) of all the points on the texture pattern are defined at respective addresses of the map memory 6. Each address of the map memory 6 corresponds to one of the points on the texture pattern. A predetermined color (RGB) of each point is read out from the map memory 6 in response to the inputting of a specific address corresponding to the point to the map memory 6.

The special-effect imaging unit 7 generates changed luminances (L') of the dots based on the luminances (L) from the scan line DDA 5 in accordance with SP data of the special-effect command from the CPU interface unit 2. The special-effect imaging unit 7 generates changed colors (RGB') of the dots based on the predetermined colors (RGB) of the texture pattern from the map memory 6 in accordance with the SP data of the special-effect command. The changed luminances (L') and the changed colors (RGB') are supplied to the multiplier unit 8.

The multiplier unit 8 generates output colors (RGB) of the dots by multiplication of the changed luminances (L') and the changed colors (RGB') which are supplied from the special-effect imaging unit 7. The output colors (RGB) are supplied from the multiplier unit 8 to a frame memory (not shown).

Figure 2:
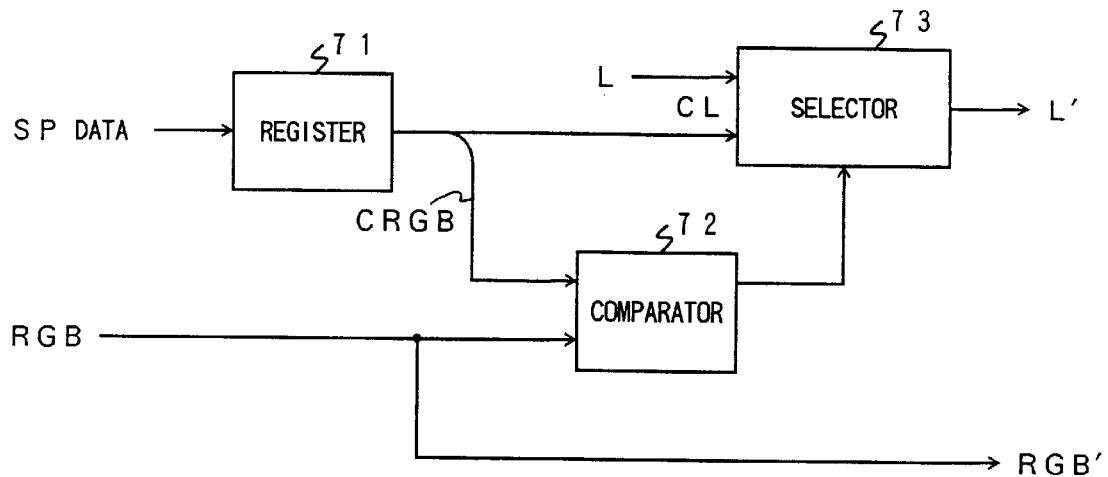
FIG. 2 is a block diagram of a special-effect imaging unit in the first embodiment of the present invention.

FIG. 2 shows a special-effect imaging unit of the image outputting apparatus in the first embodiment. This special-effect imaging unit is to generate only the changed luminances of dots.

In FIG. 2, the SP data of the special-effect command from the CPU interface unit 2 is stored in a register 71 of this special-effect imaging unit. The SP data includes a control color value CRGB which indicates a color specified as being changed, and a control luminance value CL which indicates a changed luminance of a dot whose color is the same as the specified color indicated by the CRGB.

For example, when green (R=0, G=255, B=0) among the colors on the texture pattern is specified as being changed, the CRGB stored in the register 71 is {0, 255, 0}. An original luminance of each of dots whose colors are in accordance with the specified color is changed by the special-effect imaging to the changed luminance indicated by the CL output from the register 71.

It should be noted that different control color values CRGB and different control luminance values CL can be included in the SP data of the special-effect command with respect to different frames. Accordingly, one can easily change the color and luminance of a texture-pattern dot on the display plane by defining the control color value CRGB and the control luminance value CL with respect to each of a plurality of frames.

The control color value CRGB is supplied from the register 71 to a comparator 72. Each predetermined color RGB read from the map memory 6 is also supplied to the comparator 72. The comparator 72 detects whether or not each of the predetermined colors RGB is in accordance with the color indicated by the control color value CRGB. A selection signal indicating a result of the above detection is output from the comparator 72 to a select input (S) of a selector 73.

When the binary representation of one color (RGB) consists of 3×8 bits, the above detection regarding the accordance of the predetermined color RGB with the specified color CRGB is performed by the comparator 72 for each of 24 bits of color data. However, other color representations consisting of smaller than 24 bits may be used in the special-effect imaging unit in this embodiment.

The original luminance (L) of each dot from the scan line DDA 5 and the control luminance value (CL) from the register 71 are supplied to two inputs of the selector 73 respectively. The selector 73 selectively outputs either the original luminance (L) or the changed luminance (CL) in accordance with the selection signal supplied to the select input (S) of the selector, as the output signal indicating the changed luminance (L') of the dot.

More specifically, when one of the predetermined colors (RGB) is detected to be in accordance with the specified color (CRGB), the selector 73 outputs the changed luminance (CL) as the output signal L'. When one of the predetermined colors RGB is detected not to be in accordance with the specified color (CRGB), the selector 73 outputs the original luminance (L) as the output signal L'.

By applying the special-effect imaging unit in this embodiment to the image outputting apparatus in FIG. 1, it is possible that the original luminance of a texture-pattern dot for one frame be changed to a first luminance, and the original luminance of the same dot for another frame be changed to a second luminance. The first and second luminances can freely be specified by defining the contents of the SP data for each of the frames.

Figure 3:
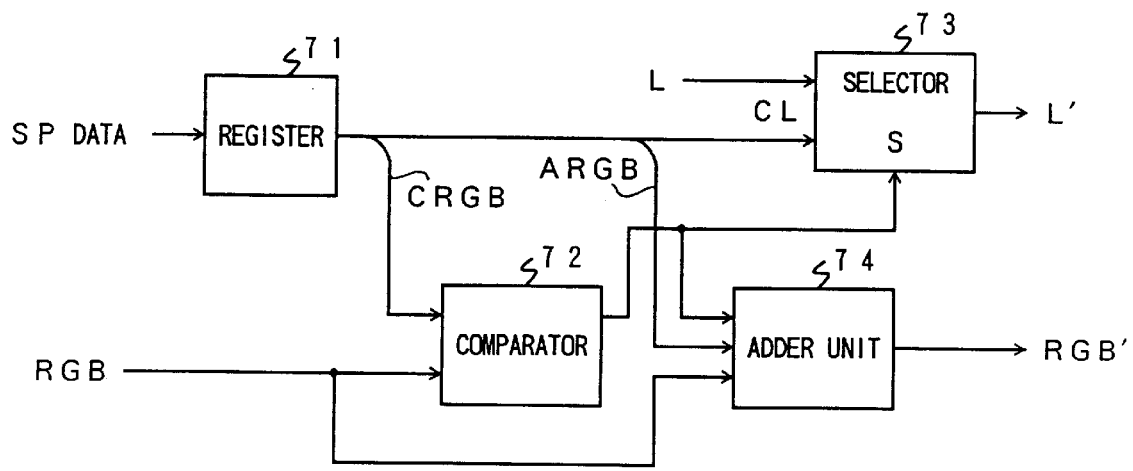
FIG. 3 is a block diagram of another special-effect imaging unit in the first embodiment.

FIG. 3 shows another special-effect imaging unit in the first embodiment. This special-effect imaging unit is to generate the changed luminances of dots on the display plane and the changed colors of the dots.

In FIG. 3, an adder unit 74 is provided in addition to the elements of the special-effect imaging unit shown in FIG. 2. In this embodiment, the SP data, stored in the register 71, includes: the control color value CRGB, the control luminance value CL, and a color increment value ARGB.

This color increment value ARGB indicates a difference between the original color value (RGB) and the changed color value (RGB') with respect to the specified color. If the color increment value ARGB is greater than zero, the changed color value (RGB') is greater than the original color value (RGB). If the color increment value ARGB is smaller than zero, the changed color value (RGB') is smaller than the original color value (RGB).

The control color value CRGB is supplied from the register 71 to the comparator 72. Each of the predetermined colors RGB read from the map memory 6 is supplied to the comparator 72. The comparator 72 detects whether or not one of the predetermined colors RGB is in accordance with the specified color indicated by the control color value CRGB. A selection signal indicating a result of the above detection is output from the comparator 72 to the selector 73.

The original luminance (L) of each dot from the scan line DDA 5 and the control luminance value (CL) from the register 71 are supplied to the two inputs of the selector 73 respectively. The selector 73 selectively outputs either the original luminance (L) or the changed luminance (CL) in accordance with the selection signal supplied to the selector, as the output signal indicating the changed luminance (L') of the dot.

In the above special-effect imaging unit, the selection signal from the comparator 72 is supplied to the adder unit 74. Further, each of the predetermined colors (RGB) from the map memory 6 and the color increment value (ARGB) from the register 71 are supplied to the adder unit 74. When one predetermined color RGB is detected to be in accordance with the specified color (CRGB), the adder unit 74 outputs the result of the addition of the RGB and the ARGB as the output signal indicating the changed color (RGB'). When one predetermined color RGB is detected not to be in accordance with the specified color (CRGB), the adder unit 74 performs no adding operation and outputs the predetermined color RGB as the output signal (RGB').

By applying the special-effect imaging unit in this embodiment to the image outputting apparatus in FIG. 1, it is possible that the original color and the original luminance of a texture-pattern dot for one frame be changed to a first color and a first luminance, and the color and the luminance of the same dot for another frame be changed to a second color and a second luminance. The first and second colors and luminances can freely be specified by defining the contents of the SP data for each of the frames.

It should be noted that different control color values CRGB, different control luminance values CL, and different color increment values ARGB can be included in the SP data of the special-effect command with respect to different frames. Accordingly, one can easily change the color and luminance of any texture-pattern dot on the display plane by defining the control color value CRGB, the control luminance value CL, and the color increment value with respect to each of a plurality of frames.

Next, a description will be given of an image outputting apparatus in a second embodiment of the present invention.

Figure 4:
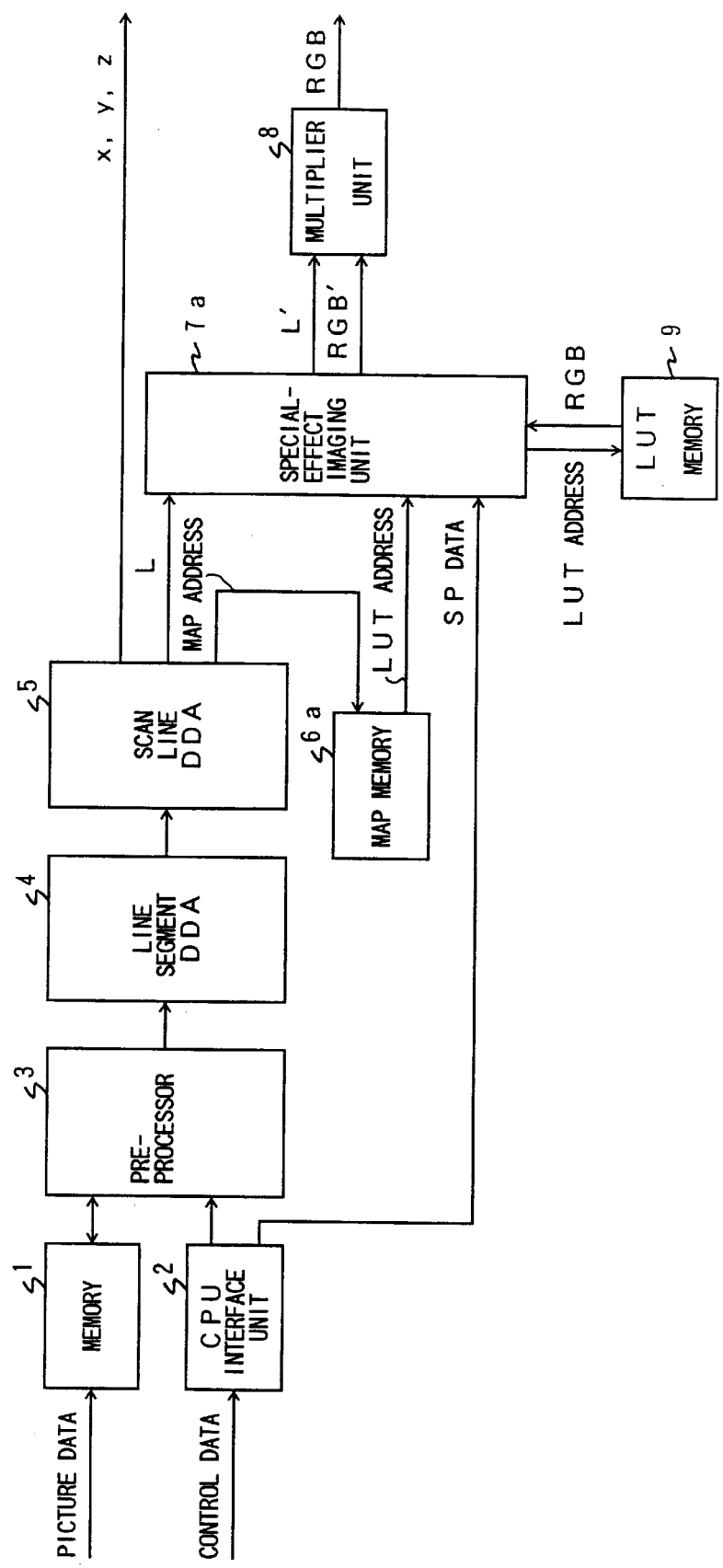
FIG. 4 is a block diagram of an image outputting apparatus in a second embodiment of the present invention.

FIG. 4 shows an image outputting apparatus in the second embodiment. In FIG. 4, the elements of the image outputting apparatus which are the same as corresponding elements in FIG. 1 are designated by the same reference numerals. The special-effect imaging in the second embodiment is suitable for image outputting apparatuses in which a relatively small number of colors are used.

In FIG. 4, a lookup table (LUT) memory 9 is provided in addition to the elements of the image outputting apparatus shown in FIG. 1. The LUT memory 9 is, for example, a random access memory (RAM). Further, a map memory 6a whose contents are different from the contents of the map memory 6 in FIG. 1 is provided in the image outputting apparatus in FIG. 4.

In the LUT memory 9, a lookup table is stored. In this lookup table, a plurality of predetermined colors (RGB) of all points in a first area on the texture pattern and a plurality of predetermined colors (RGB) of all points in a second area on the texture pattern are defined. The first area is related to the predetermined colors subject to the special-effect imaging, and the second area is related to the predetermined colors of the original image.

Each of the predetermined colors (RGB) of all the points on the texture pattern is read out from the LUT memory 9 when a LUT address indicating one of the points on the texture pattern is input to the LUT memory 9. Each of the predetermined colors (RGB) read from the LUT memory 9 is supplied to a special-effect imaging unit 7a in this embodiment, in response to the input of the LUT address.

In the map memory 6a, a map is stored. In this map, the LUT addresses of the LUT memory 9 are defined at respective map addresses of the map memory 6a. Each of the LUT addresses is read from the map memory 6a when an address of the map memory 6a indicating a point on the texture pattern is input to the map memory 6a. Each of the LUT addresses read from the map memory 6a is supplied to the special-effect imaging unit 7a in response to the input of the map address.

In the above second embodiment, the special-effect imaging unit 7a generates changed luminances (L') of dots on the display plane based on the luminances (L) from the scan line DDA 5 in accordance with the SP data of the special-effect command from the CPU interface unit 2. The special-effect imaging unit 7a generates changed colors (RGB') of the dots based on the predetermined colors (RGB) of the texture pattern from the LUT memory 9 in accordance with the SP data of the special-effect command. The changed luminances (L') and the changed colors (RGB') are supplied to the multiplier unit 8.

In FIG. 4, the other elements of the image outputting apparatus are the same as corresponding elements shown in FIG. 1, and a description thereof will be omitted.

Figures 5, 6:
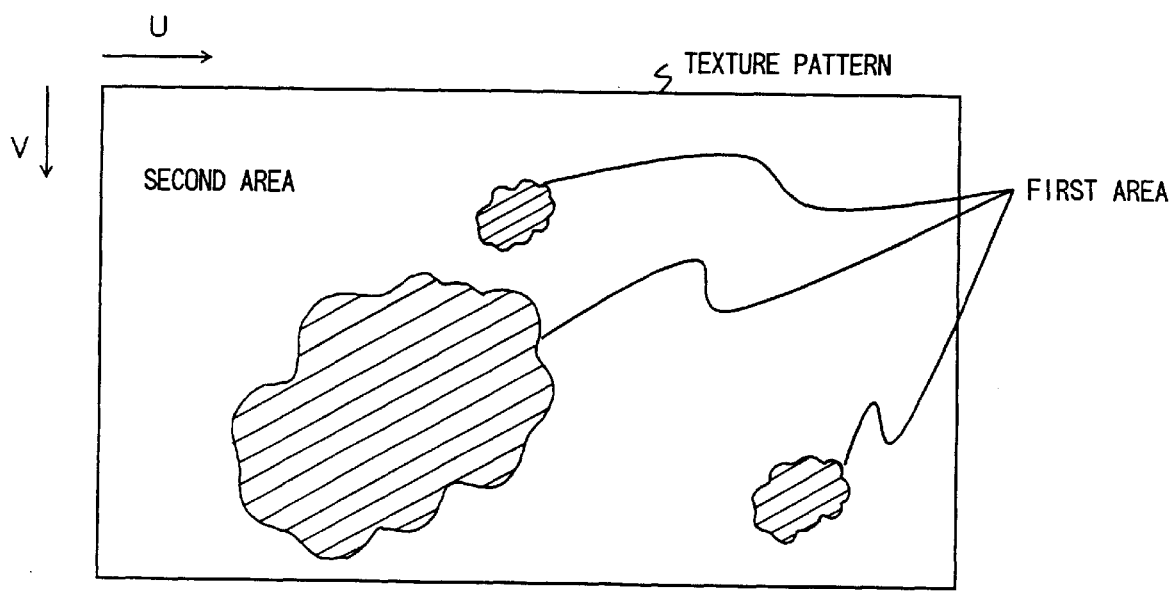
FIG. 5 is a diagram showing a format of a lookup table memory in the second embodiment.
FIG. 6 is a diagram showing a texture pattern in the second embodiment.

FIG. 5 shows a format of the lookup table (LUT) memory 9 in the second embodiment. As shown in FIG. 5, a storage area of the LUT memory 9 is divided into a first area related to the special-effect imaging and a second area related to the original image. The plurality of predetermined colors (RGB) are stored in the first area (located at LUT addresses 0 through S) of the LUT memory 9, and the predetermined colors stored in the first area may be changed by the special-effect imaging unit 7a. Also, luminances of corresponding points on the texture pattern may be changed by the special-effect imaging unit 7a.

Another plurality of predetermined colors (RGB), which are related to the original image and not changed by the special-effect imaging unit 7a, are stored in the second area (located at LUT addresses S+1 through N) of the LUT memory 9.

FIG. 6 shows a texture pattern in the second embodiment. Luminance and color values related to the predetermined colors (RGB) of points in the first area on this texture pattern may be converted to luminance and color values of dots on the display plane by the special-effect imaging unit 7a. However, luminance and color values related to the predetermined colors (RGB) of points in the second area on the texture pattern in FIG. 6 are not changed by the special-effect imaging unit 7a. By making use of the LUT memory 9 whose storage area is divided into the first area and the second area, as shown in FIG. 6, it is possible to use the same color in the first area and in the second area on the texture pattern.

In the above second embodiment, the use of the LUT memory 9 described above makes it possible for computer game engineers to easily develop a computer game software. Also, the storage capacity of the map memory 6a can be reduced remarkably because the map memory 6a stores the map in which only the LUT addresses are defined. This makes the cost of manufacture of the image outputting apparatus lower.

As described above, in the second embodiment, a LUT address indicating one point on the texture pattern is read from the map memory 6a, and this LUT address is supplied to the special-effect imaging unit 7a and also to the LUT memory 9. A predetermined color (RGB) is read from the LUT memory 9 (either the first area or the second area) in response to the input of the LUT address. The predetermined color (RGB) read from the LUT memory 9 is supplied to the special-effect imaging unit 7a.

The special-effect imaging unit 7a generates the changed luminances (L') and the changed colors (RGB') in accordance with the SP data from the CPU interface unit 2, as described above, and these values are supplied from the special-effect imaging unit 7a to the multiplier unit 8. Thus, the special-effect imaging is carried out by the special-effect imaging unit 7a.

Figure 7:
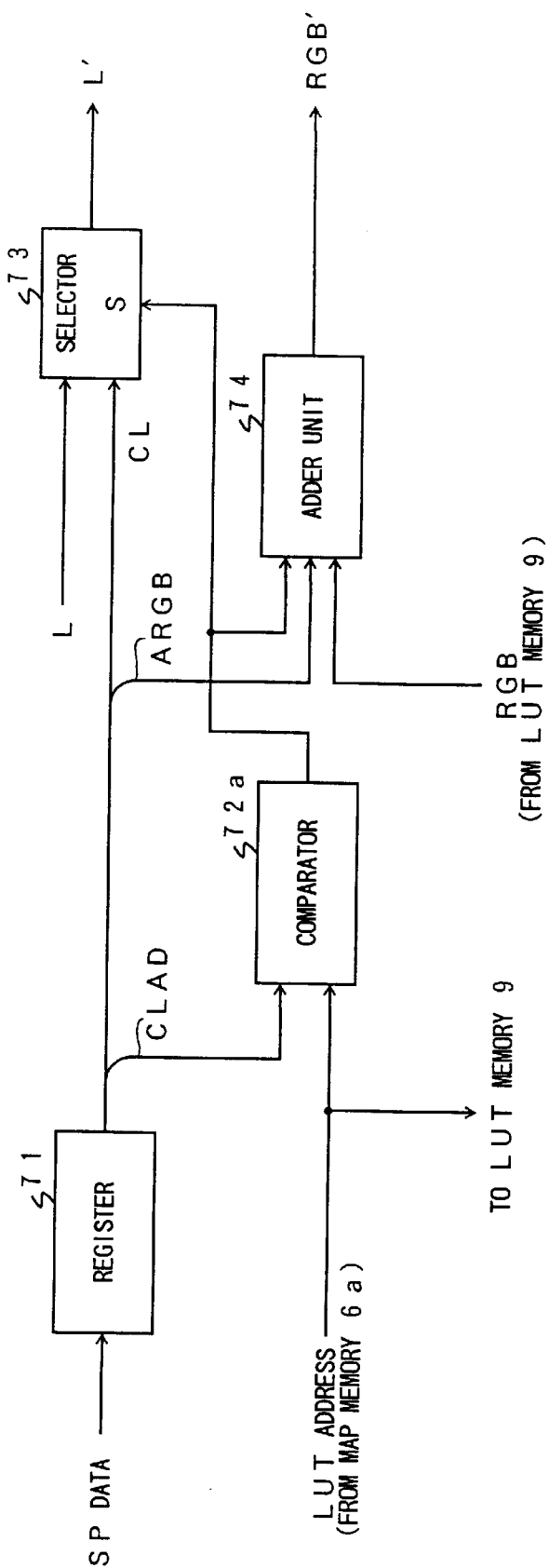
FIG. 7 is a block diagram of a special-effect imaging unit in the second embodiment.

FIG. 7 shows a special-effect imaging unit in the second embodiment. This special-effect imaging unit is to generate the changed luminances of dots on the display plane and the changed colors of the dots, similarly to the embodiment in FIG. 3.

In FIG. 7, a comparator 72a which is different from the comparator 72 in FIG. 3 is provided in the special-effect imaging unit, and the other elements which are the same as corresponding elements in FIG. 3 are designated by the same reference numerals.

In this embodiment, the SP data, stored in the register 71, includes: a control lookup table address CLAD, the control luminance value CL, and the color increment value ARGB. This control lookup table address CLAD indicates a point on the texture pattern, that is, the CLAD indicates a specified LUT address where the specified color to be changed is stored in the LUT memory 9. The color increment value ARGB indicates a difference between the original color value (RGB) and the changed color value (RGB') with respect to the specified color. The control luminance value CL indicates a changed luminance of a dot whose color is the same as the specified color The control lookup table address CLAD is supplied from the register 71 to the comparator 72a. Each of the LUT addresses read from the map memory 6a is supplied to the comparator 72a. The comparator 72a detects whether or not one of the LUT addresses is in accordance with the specified LUT address indicated by CLAD. A selection signal indicating a result of the above detection is output from the comparator 72a to the selector 73 and to the adder unit 74.

The original luminance (L) of each dot from the scan line DDA 5 and the control luminance value (CL) from the register 71 are supplied to the selector 73. The selector 73 selectively outputs either the original luminance (L) or the changed luminance (CL) in accordance with the selection signal supplied to the selector, as the output signal indicating the changed luminance (L') of the dot.

In the above embodiment, the selection signal from the comparator 72a is supplied to the adder unit 74. Further, each of the predetermined colors (RGB) from the LUT memory 9 and the color increment value (ARGB) from the register 71 are supplied to the adder unit 74. When one predetermined color RGB is detected to be in accordance with the specified color (CRGB), the adder unit 74 outputs the result of the addition of the RGB and the ARGB as the output signal indicating the changed color (RGB'). When one predetermined color RGB is detected not to be in accordance with the specified color (CRGB), the adder unit 74 performs no adding operation and outputs the predetermined color RGB as the output signal (RGB').

By applying the special-effect imaging unit in this embodiment to the image outputting apparatus in FIG. 4, it is possible that the same color is used both for the original color of a point in the second area on the texture pattern and for the changed colors of another point in the first area thereon.

Figure 8:
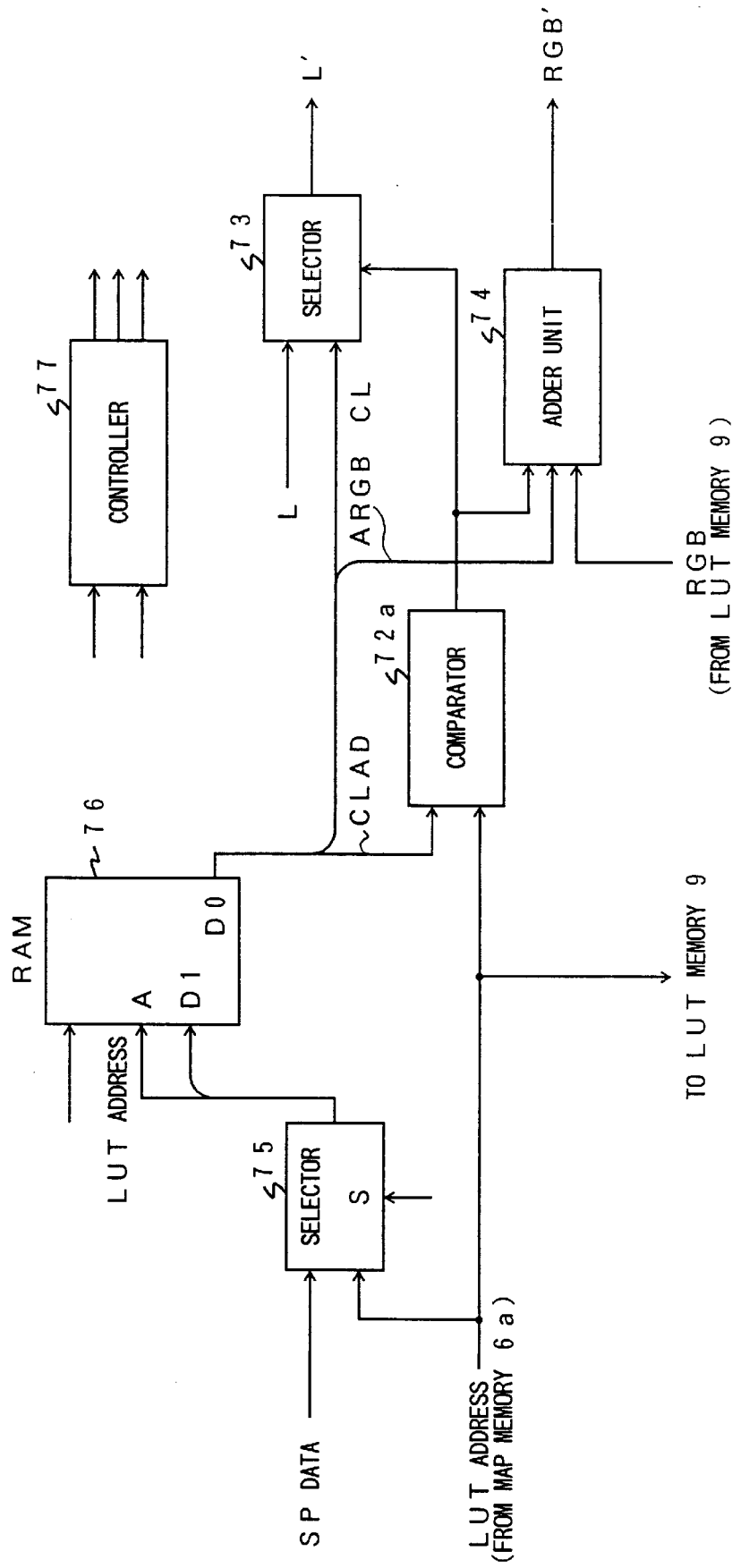
FIG. 8 is a block diagram of another special-effect imaging unit in the second embodiment.

FIG. 8 shows another special-effect imaging unit in the second embodiment. In this embodiment, a random access memory (RAM) 76 is used instead of the register 71 in FIG. 7, a selector 75 connected to inputs of the RAM 76 is provided, and a controller 77 for controlling each operation of the RAM 76, the selector 75, and the other elements is provided.

In this embodiment, the SP data stored in the RAM 76 includes: a control lookup table address CLAD, a control luminance value CL, and a color increment value ARGB. The control lookup table address, CLAD indicates a specified LUT address where the specified color to be changed is stored in the LUT memory 9. The control luminance value CL indicates a changed luminance of a dot whose color is the same as the specified color. The color increment value ARGB indicates a difference between the original color value and a changed color value.

These values are predetermined with respect to each of a plurality of frames, and the SP data including these values, output from the CPU interface unit 2 with respect to each of the frames, are stored in the RAM 76 at respective addresses of the RAM 76.

In the special-effect imaging unit in FIG. 8, the SP data output from the CPU interface unit 2 and a LUT address are supplied to the selector 75. The controller 77 controls operations of inputting data to and outputting data from the selector 75. The SP data and the LUT address output from the selector 75 are stored in the RAM 76 at predetermined addresses.

In FIG. 8, the controller 77 controls respective operations of the RAM 76, the comparator 72a, the adder unit 74, and the selector 73. The operation of these elements of the special-effect imaging unit in FIG. 8 is the same as the operation of corresponding elements in FIG. 7.

In addition, according to the present invention, a plurality of registers may be used in the special-effect imaging unit, instead of the RAM 76 in FIG. 8.

By applying the special-effect imaging unit in this embodiment to the image outputting apparatus in FIG. 4, it is possible that the special-effect imaging is more easily carried out with a greater flexibility.

Further, the present invention is not limited to the above-described embodiments, and variations and modifications may be made without departing from the scope of the present invention.

What is claimed is:

1. An apparatus for outputting an image in which picture data of points on a texture pattern are mapped to picture data of dots on a display plane, said apparatus comprising:

a map memory for storing a texture map in which a plurality of predetermined RGB colors of all pixels on the texture pattern are defined, each of the predetermined RGB colors being read from said map memory when an address of said map memory indicating a pixel on the texture pattern is input;

storing means for storing at least a pair of control values including a control RGB color value and a corresponding control luminance value;

a comparator for comparing the control RGB color value from said storing means with a predetermined RGB color read from said map memory for determining whether the predetermined RGB color read from said map memory is the same as a specified RGB color indicated by the control RGB color value output from said storing means; and a selector for selectively outputting either an original luminance or a changed luminance indicated by the control luminance value output from said storing means, in accordance with a result of said comparison by said comparator, said selecting means outputting the control luminance value only when a predetermined RGB color is detected to be exactly the same as the control RGB color value, said storing means, comparator and selector being discrete components which together perform pipeline processing for selectively modifying a luminance value.

2. The apparatus according to claim 1 wherein a color increment value is further stored in said storing means, further comprising:

adder means for selectively outputting either an original color or a changed color indicated by an addition of the original color and the color increment value output from said storing means, in accordance with a result of said comparison by said comparator.

3. The apparatus according to claim 1 wherein the control color value and the control luminance value are predetermined with respect to each of a plurality of frames, and wherein one of said control color values and one of said control luminance values, which are predetermined with respect to one frame, are stored in said storing means.

4. The apparatus according to claim 2 wherein the color increment value, the control color value and the control luminance value are predetermined with respect to each of a plurality of frames, and wherein one of said color increment values, one of said control color values and one of said control luminance values, which are predetermined with respect to one frame, are stored in said storing means.

* * * * *